(12) United States Patent
Pickering et al.

(10) Patent No.: US 10,126,137 B2
(45) Date of Patent: Nov. 13, 2018

(54) METHODS AND SYSTEMS TO CONVEY AUTONOMOUS/SEMI-AUTONOMOUS FEATURE AVAILABLE ROADWAYS

(71) Applicant: GM GLOBAL TECHNOLOGY OPERATIONS LLC, Detroit, MI (US)

(72) Inventors: Corey Pickering, Brighton, MI (US); Bing Deng, Bloomfield Hills, MI (US); David Allen Craig, Owasso, OK (US); Melissa Faustich, Macomb, MI (US); Vincent Barrett Walkup, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/428,934

(22) Filed: Feb. 9, 2017

(65) Prior Publication Data

US 2018/0224286 A1    Aug. 9, 2018

(51) Int. Cl.
*G01C 21/34* (2006.01)
*G01C 21/36* (2006.01)

(52) U.S. Cl.
CPC .......... *G01C 21/34* (2013.01); *G01C 21/367* (2013.01); *G01C 21/3611* (2013.01); *G01C 21/3667* (2013.01)

(58) Field of Classification Search
CPC ........................... G05D 1/0255; G05D 1/0272
See application file for complete search history.

(56) References Cited

U.S. PATENT DOCUMENTS

| 9,188,985 B1* | 11/2015 | Hobbs | G01C 21/34 |
| 2013/0096819 A1* | 4/2013 | Tarnok | G01C 21/00 701/428 |
| 2017/0040004 A1* | 2/2017 | He | G09G 5/377 |

* cited by examiner

*Primary Examiner* — Yonel Beaulieu
*Assistant Examiner* — Martin A Weeks
(74) *Attorney, Agent, or Firm* — Lorenz & Kopf, LLP (57) ABSTRACT

Methods and apparatus are provided for navigation of a vehicle. In one embodiment, a navigation system includes: a map database, and a navigation processor. The map database includes a map layer of autonomous road data, and at least one other layer of map data. The navigation processor is configured to determine a route for a vehicle to a destination preferring use of autonomous roads according to a setting for preferring use of autonomous roads and based on the map layer of autonomous road data and the at least other layer of map data; and display a display map for a vehicle through a navigation display unit including highlighting autonomous roads on the navigation display unit, based on the map layer of autonomous road data, together with the at least one other layer of map data.

15 Claims, 4 Drawing Sheets

METHODS AND SYSTEMS TO CONVEY AUTONOMOUS/SEMI-AUTONOMOUS FEATURE AVAILABLE ROADWAYS

TECHNICAL FIELD

The technical field generally relates to autonomous/semi-autonomous vehicles that use autonomous driving maps for controlling a vehicle. Additionally, the technical field relates to vehicle navigation maps.

BACKGROUND

Vehicle navigation systems are used to guide a driver along a determined route to a destination. Current navigation systems provide for various route preferences settings to be selected such as preferring highways or land routes.

Surveys are performed on roads in order to generate autonomous driving road data to support autonomous driving features, usually referred to as autonomous driving maps. Currently, the autonomous road data is made using surveying techniques that combine LiDAR scanning with differential GPS. Not all roads have been surveyed and thus such precise autonomous road data will be lacking. Such detailed autonomous road data can be used for autonomous vehicle control.

In time, more and more roads will be surveyed to make the roads autonomous vehicle suitable. Accordingly, it is desirable to provide navigation systems adapted for recognizing roads that are surveyed for autonomous driving. In addition, it is desirable to ensure navigation maps and autonomous driving maps are kept up to date. Furthermore, other desirable features and characteristics of the present invention will become apparent from the subsequent detailed description of the invention and the appended claims, taken in conjunction with the accompanying drawings and the background of the invention.

SUMMARY

Methods and apparatus are provided for navigation of a vehicle. In one embodiment, a navigation system includes: a map database, comprising: a map layer of autonomous road data, and at least one other layer of navigation map data; and a navigation processor configured to perform at least one of: determining a route for a vehicle to a destination preferring use of autonomous roads according to a setting for preferring use of autonomous roads and based on the map layer of autonomous road data and the at least other layer of navigation map data; and displaying a display map for a vehicle through a navigation display unit including highlighting autonomous roads on the navigation display unit, based on the map layer of autonomous road data together with the at least one other layer of navigation map data.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the terms module and unit refer to an application specific integrated circuit (ASIC), an electronic circuit, a processor (shared, dedicated, or group) and memory that executes one or more software or firmware programs, a combinational logic circuit, and/or other suitable components that provide the described functionality. In particular, the units and modules described herein include at least one processor, a memory and computer program instructions stored on the memory for implementing the various functions and processes described with respect to the modules and units. Although separate modules and units are described herein, this does not exclude an integrated topology.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of steering control systems, and that the vehicle system described herein is merely one example embodiment of the invention.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
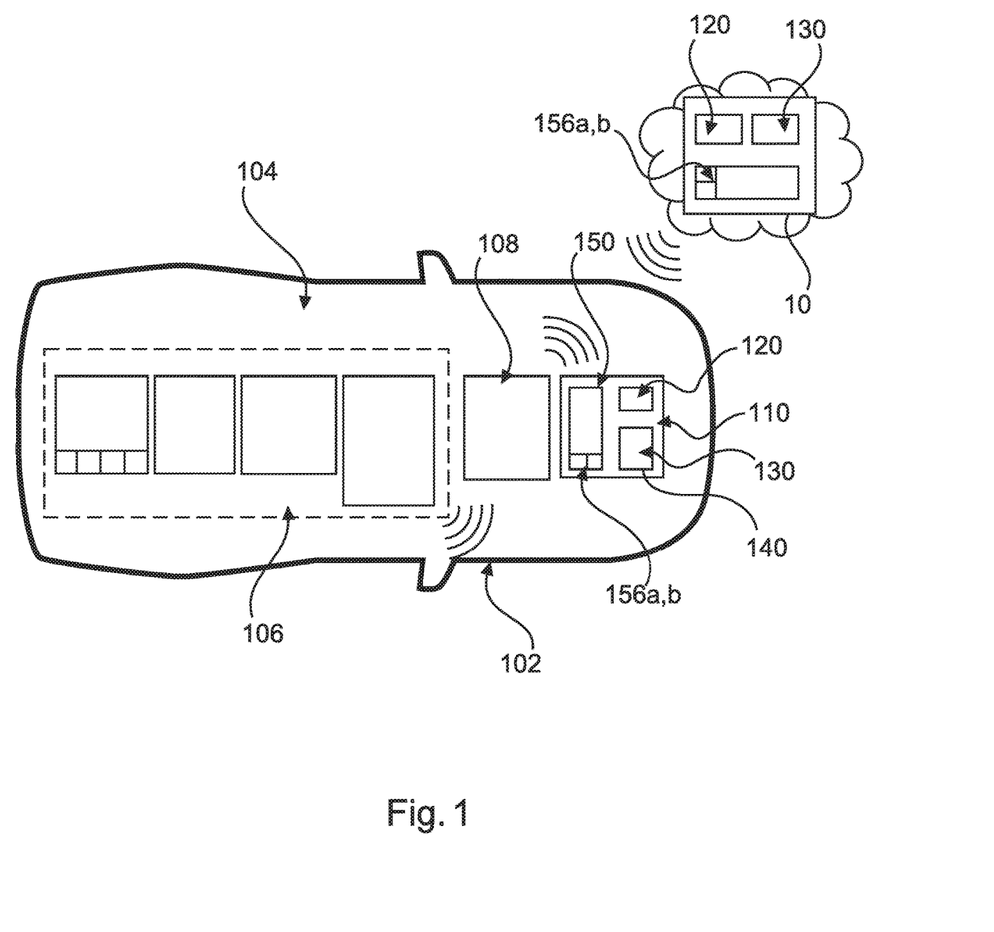
FIG. 1 is a functional block diagram of a vehicle having a navigation system, in accordance with various embodiments.
Figure 2:
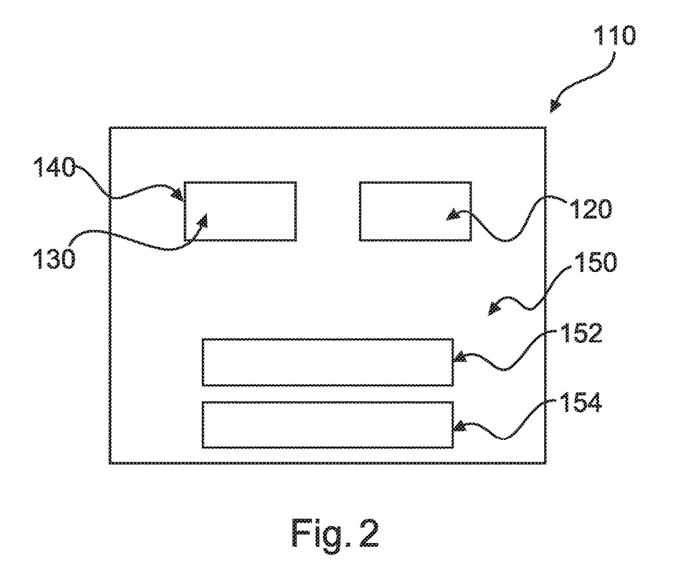
FIG. 2 is a data flow diagram illustrating the navigation system, in accordance with various embodiments.
Figure 4:
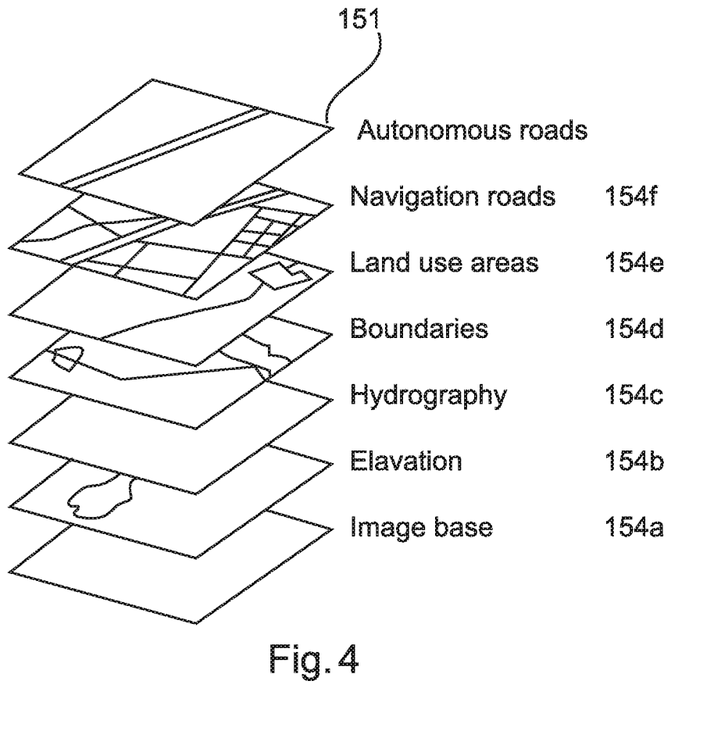
FIG. 4 is an illustration of a stacking of map data in a map database, in accordance with various embodiments.

With reference to FIG. 1, a system is shown including a vehicle 102, a vehicle control system 104, a navigation system 110, a network interface 108 and a remote server 10. The navigation system 110 includes a navigation processor 120, a navigation display unit 140, a client interface 130, and a map database 150 having parts stored in different data storage locations 156 a, b. Referring additionally to FIGS. 2 and 4, the map database 150 comprises an autonomous driving map 152 and a navigation map 154.

The navigation processor 120 is configured to process the map data from the two different sources 152*a*, 152*b*, optionally determine a route path and send navigation instructions to the vehicle control system 104 when the vehicle 102 is at an autonomous capable road and/or send visual data to the navigation display unit 140. In particular, the navigation processor 120 is configured to extract a layer of autonomous road data 151 from the autonomous driving map 152 and to overlay the layer of autonomous road data 151 with the at least one other layer of map data 154 in a visual display through the navigation display unit 140 for viewing by a driver of the vehicle 102. Additionally or alternatively, the navigation processor 120 is configured to determine a route to a destination from a starting location (e.g. the vehicle's current location) in a way that prefers taking autonomous roads based on identification of autonomous capable roads in the map database 150. Whether a road of the navigation map 154 is an autonomous road is determined based on the autonomous driving map 152. The navigation processor 120 gives extra weight to favor such roads in navigation algorithms. The determined route can be communicated to the driver through audible commands and through a visual display on the navigation display unit 140. The vehicle 102 can be directed to an autonomous road by following navigation instructions from the navigation processor 120. At the autonomous road, driving of the vehicle can be handled by the vehicle control system 104 (optionally with assistance from the driver) using data from the autonomous driving map.

In various embodiments, an autonomous driving map 152 is stored in data storage location 156*a*. The autonomous driving map is a machine to machine map that is useable by the vehicle control system 104 to execute autonomous or semi-autonomous vehicle control. The autonomous driving map 152 is created from detailed surveys of roads through, for example, range finding scanning devices, such as Lidar devices, and differential or conventional GPS measurements. The survey data is highly compressed to form the autonomous driving map 152, which describes a range of road attributes based on the survey data required for operation of autonomous or semi-autonomous vehicle control through the vehicle control system 104, which are correlated with global positioning measurements.

In various embodiments, the navigation map 154 is stored in data storage location 156*b*. The navigation map 154 is a machine to human map in that it is designed to be displayed for understanding and visualization by a human through navigation display unit 140 for the purpose of a driver navigating the vehicle 102. The autonomous driving map 152 is configured for interaction with the vehicle control system 104, but would be generally unintelligible to a driver if displayed. As will be described further herein, in some embodiments, the navigation processor 120 is configured for identifying autonomous roads from the autonomous driving map 152. Based on the identified roads, a layer of autonomous road data marks the autonomous roads relative to other layers in the navigation map 154 so that the autonomous roads can be visually differentiated when displayed through the navigation display unit 140 and/or so that the navigation processor 120 is able to navigate with autonomous roads preferred.

In various embodiments, the remote server 10 includes a navigation system 110 with a navigation processor 120, a navigation display unit 140 and a client interface 130, a map database 150. In other words, the remote server 10 can mirror features of the navigation system 110 on the vehicle 102. The network interface 108 and the remote server 10 connect the vehicle 102 with a mobile communications network. By that, it is possible to send data from the remote server 10 to the network interface 108 of the vehicle 102, which is connected to the vehicle control system 104. In particular, the determined route and/or visual display data can be sent to the vehicle 102. In other words, the navigation system 110 is arranged on the remote server 10 or the vehicle 102 or both. In addition, the autonomous map data 152 in the vehicle 102 can be updated from the remote server 10 through the network interface 108 and the mobile telecommunications network or other data communication network That is, as a network of autonomous capable roads grows due, for example, to continued surveying with autonomous road mapping vehicles, the map database 150 in the vehicle 102 can be updated from the remote server 10. Further, any updates to autonomous road features for pre-existing autonomous roads in the map database 150 can be pushed from the remote server 10 to the vehicle 102. In embodiments, the remote server 10 is implemented through a plurality of separate servers. A first remote server can update the navigation map 154, a second remote server can update the autonomous driving map 152, and a third server can update the system for new features. The first, second and third servers utilize the mobile telecommunications network.

In various embodiments, the autonomous or semi-autonomous vehicle control system 104, including a vehicle sensing module 106, is configured to process vehicle navigation instructions from the navigation system 110. Accordingly, when the vehicle is located on an autonomous capable road, semi-autonomous or autonomous vehicle control can be activated, which uses the autonomous map 152. The vehicle sensing module 106 includes vehicle sensors such as a LIDAR sensing device, a RADAR sensing device, a camera sensing device, and/or vehicle to vehicle and vehicle to infrastructure devices. The sensing module is able to fuse the sensed data and process such fused data in order to see the road and objects around it. The autonomous vehicle control system 104 uses the sensing module 106, the autonomous driving map 152 and navigation instructions from the navigation system 110 in order to safely traverse a designated route to a destination.

The vehicle 102 and the vehicle control system 102 described herein may be have a level of autonomous capability ranging from zero to five according to the well know SAE International classification scheme. In various embodiments, the vehicle 102 is at a level of autonomy from one to five. Accordingly, the vehicle 102 may have at least one of the following autonomous driving capabilities: Adaptive Cruise Control (ACC), Parking Assistance with automated steering, Lane Keeping Assistance (LKA) Type II, autonomous control of accelerating, braking, and steering. The vehicle 102 may allow a driver to take control through acceleration, braking and steering interfaces as required or as desired. In particular, on roads for which autonomous mapping data is available, the vehicle 102 is able to operate autonomously to an extent that a driver can safely turn their attention away from driving tasks, but must still be prepared to take control when needed or to such an extent that driver attention is not required, whereas on roads for which autonomous mapping data is not available in the map database 150, a greater degree of driver control may be required.

Although the figures shown herein depict an example with certain arrangements of elements, additional intervening elements, devices, features, or components may be present in actual embodiments. It should also be understood that FIG. 1 is merely illustrative and is not be drawn to scale.

With reference now to FIG. 2, a more detailed view of the components of an exemplary navigation system 110 from FIG. 1 is shown including, a map database 150, a navigation display unit 140, a navigation processor 120 and a client interface 130. As has previously been discussed, the navigation system 110 may be located at the remote server 10, on board the vehicle 102, or distributed there between. When located at the remote server 10, display and route outputs from the navigation system 100 can be transmitted to the vehicle 102 over the mobile telecommunications network.

The map database 150 comprises an autonomous driving map 152, and a navigation map 154. The autonomous driving map 152 is generated from extreme compression of three-dimensional spatial data using a range finding device and global positioning data to provide autonomous road features correlated with global position data for autonomous roads. The information making up the autonomous driving map 152 is dynamic in the sense that it can be updated. In an example, autonomous driving map is generated from LiDAR surveying data and differential GPS. Differential GPS is an enhancement to GPS that provides improved location accuracy, from the 15-meter nominal GPS accuracy to about 10 cm in case of the best implementations. The LiDAR survey provides a three-dimensional, 360° picture around a road. The LiDAR survey results in an impractically large amount of data per mile to be included in the map database 150 in raw form. The data is compressed to descriptors and other data features allowing autonomous driving operation through the vehicle control system 104. In an additional or alternative embodiment, the autonomous driving map is generated from camera surveying data obtained with standard or differential GPS and multiple repeated samples over time. The autonomous driving map 152 is utilized by the vehicle control system 104 for controlling the vehicle autonomously, i.e. leading the vehicle to a destination according to instructions from the navigation system 110 when on an autonomous road for which such data is available. The vehicle's sensor system 106 allows for object detection, tracking and avoidance.

The navigation map 154 is a sum of different individual layers as can be seen in the example of FIG. 4. In the shown example, the different individual layers contain image base data 154a, elevation data 154b, hydrography data 154c, boundaries data 154d, land use area data 154e and navigation roads 154f. The individual layers are stacked together. This means that the individual layers are georeferenced, aligned to each other and merged together to create one navigation map. This navigation map 154 is used by the navigation processor 120 to determine, using a navigation algorithm, a route from a start location to a destination location. The navigation map 154 is designed for human visualization through navigation display unit 140. The navigation map 154 further includes as an overlay, or integrated therewith, an additional map layer 151 identifying road for which autonomous mapping data is available in the autonomous driving map 152. In this way, the navigation map 154 can be used for routing purposes with autonomous roads part of navigation preferences and/or the navigation map 154 allows autonomous roads to be visually highlighted along with other conventional navigation map features.

The map database 150 combines data on roads capable of autonomous driving from the map layer of autonomous data 151 with the other layers of map data 154 (a-f). These two maps can be stacked visually, i.e. the map layer of autonomous data 151 can be overlaid on the navigation map, which can then be displayed through the navigation display unit 140, thereby providing a visual reference to the user on the at least one other layer of map data 154 showing roadways allowing autonomous/semi-autonomous vehicle operation. In this regard, the two maps will be georeferenced and aligned to each other. In various embodiments, the map layer of autonomous data 151 and at least one other layer of map data 154 are potentially separate maps, and can remain separate for overlay display purposes. In various embodiments, the at least one other layer of map data 154 and the map layer of autonomous data 151 can be derived from different storage locations/sources 156a, 156b. In various embodiments, the map data from the navigation and autonomous road maps may be combined in a more integrated way, whereby the two maps communicate between each other so that the navigation map can be marked with autonomous road data from the autonomous driving map 152 to allow not only display, but also route determination from the combined maps. Based on the route determined based on the map layer of autonomous data 151 and the at least one other layer of map data 154a-f, the navigation system 110 is capable to output navigation instructions to the navigation display unit 140 leading the vehicle 102 to the user's destination.

The map database 150 may be originally created with the layer of autonomous road data 151 along with the layers of other navigation map data 154. Alternatively, the layer of autonomous road data 151 can be derived from the autonomous driving map 152 through the navigation processor 120 or through a remote processor. Derivation of the layer of autonomous road data 151 can be performed real-time as a navigation display or navigation route determination requirement is received. The derivation can include identifying, based on the autonomous driving map, autonomous roads, georeferencing the autonomous roads from the autonomous driving map 152 and the roads in the navigation map and, based thereon, creating the layer of autonomous road data 151.

In exemplary embodiments, the navigation processor 120 is a processing unit (see in FIG. 3) operating computer readable instructions stored on memory (non-transient memory) which, in one embodiment, determines a route for the vehicle 102 to a destination preferring use of autonomous roads according to a setting for preferring use of autonomous roads and based on the map layer of autonomous road data 151. Additionally or alternatively, the navigation processor 120 is configured to generate a display of a route for a vehicle 102 through a navigation display unit 140 including highlighting autonomous roads on the navigation display unit 140, based on the map layer of autonomous road data 151, together with the at least one other layer of map data 154.

In exemplary embodiments, the navigation processor 120 performs the overlaying of the data from the map layer of autonomous data 151 and the at least one other layer of data 154 (navigation map). Further, in embodiments, the navigation processor 120 is configured to receive at least one navigation setting from a user, determine a route based on the navigation settings and display the route on a display unit. This is further illustrated in FIG. 3, which shows the different modules of the navigation processor 120 and the external inputs and outputs.

Figure 3:
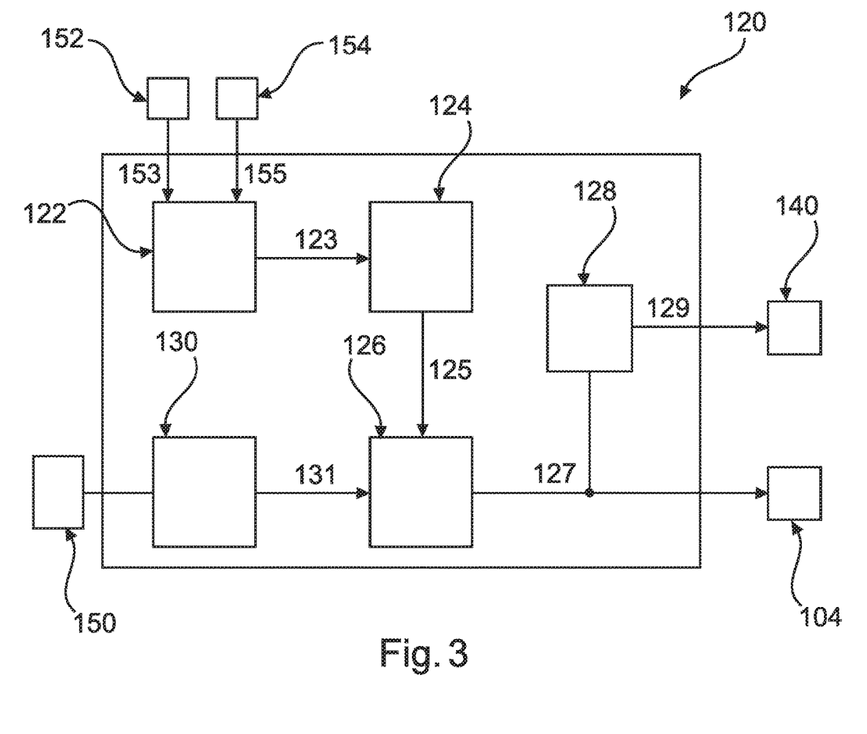
FIG. 3 is a flow diagram of a navigation processor illustrating processing steps of the navigation system, in accordance with various embodiments.

With reference now to FIG. 3, an exemplary embodiment of a navigation processor 120 is shown including a map receiving module 122, a map integration module 124, a route determination module 126, a display generation module 128 and a navigation settings module 130. FIG. 3 shows further hardware modules like a client interface 130, a navigation display unit 140, and the autonomous vehicle control system 104.

The map receiving module 122 is configured to receive data 153 of the autonomous driving map 152 and the navigation map 154. The received map data 123 can be from two different sources, which are then transferred to the map integration module 124.

In embodiments, the integration module 124 is configured to identify autonomous roads from the autonomous driving map 124 and to create a layer of autonomous road data 151. The integration module 124 is configured to geo-reference the layers 151, 154a-f of the map data 123 by correlating GPS coordinates of the respective layers 151, 154a-f. The integration module 124 is configured to align the geo-referenced map layers 151, 154a-f to each other. In the map integration module 124, the two referenced and aligned maps are then stacked. In exemplary embodiments, the two maps are visually connected to each other, e.g. the map layer of autonomous data 151 will be overlaid on the conventional navigation map 154, to allow for a visual reference to the user on the at least one other layer of map data 154 which roadways allow autonomous/semi-autonomous vehicle operation. In embodiments, the integration module 124 is configured to further integrate the map layers 151, 154a-f, so that the at least one other layer of map data 154 has autonomous roads marked therein based on the map layer of autonomous data 151 to allow for route determination through a navigation algorithm as described further below. Other methods of creating a layer of autonomous road data 151 are envisaged.

In exemplary embodiments, the navigation processor 120 is configured to generate a navigation settings menu through a navigation settings module 130, which can be used by a client interface 130. The client interface 130 can be integrated in the navigation display unit 140 as a touch screen or can be another kind of interface for receiving an input from a user to the navigation processor 120. The navigation settings module 130 is configured to receive navigation preferences from the user through the generated navigation settings menu. One user selectable option, through the client interface 130 of the navigation setting menu, is to determine routes by preferring autonomous roads. The client interface 130 can be used to receive a desired destination input from a user based on user selection in the navigation settings menu through the client interface 130, preferences data 131 is generated sent to a route determination module 126.

The route determination module 126 is configured to determine a route to a desired destination. Besides, the conventional listing of alternative routes based on navigation settings like taking the highway or land route, of fastest versus shortest routes in terms of time, the route determination module 126 can determine a route based on the preference of using an autonomous capable road. The route determination module 126 makes use of a navigation algorithm to determine a route, with autonomous roads preferred, between a start and a target location. Autonomous capable roads are identified by the route determination module 126 based on the integrated map data 123 received from the integration module 124. In this regard, it is possible that the user can choose out of a list of alternative routes like the fastest route or the shortest routes and an autonomous route which is based on the stacked map layer data 123. The route determination module 126 produced route data 127 representing the determined route, which can be used in various exemplary ways as described below.

In an exemplary embodiment, a display generation module 128 is configured to receive the route data 127. The display generation module 128 is configured to generate a display including a visual display map based on the navigation map 154 and including highlighting autonomous roads based on the layer of autonomous road data 151 as well as highlighting the determined route based on the route data 127. The visual map generated by the display generation module 128 is transferred to a navigation display unit 140. The navigation display unit 140 can be one of the conventional HMI displays. In addition or alternatively, the route data 127 is sent to an autonomous vehicle control system 104 when on an autonomous capable road. The autonomous vehicle control system 104 leads the vehicle to the desired destination based on the route data processed by the route determination module 126 and based on autonomous vehicle control algorithms that take into account obstruction data determined based on sensor data from the sensor module 106. The route data 127 can, in an embodiment, be understood as output navigation instructions to the autonomous vehicle control system 104.

With reference now to FIG. 4, an example of stacking of the map layer of autonomous road data 151 and the other layers of map data (154a-f) is shown. They are geo-referenced, aligned, stacked, and displayable. When displayed, the integrated map can be utilized by a user to navigate based on autonomous roads highlighted on a display of at least one other layer of map data 154 (e.g. as an overlay). Additionally or alternatively, the integration can be such that the maps are used by the navigation processor 120 to determine a route as described above that prefers autonomous roads. The determined route can be displayed and/or sent to the autonomous vehicle control system 104.

Figure 5:
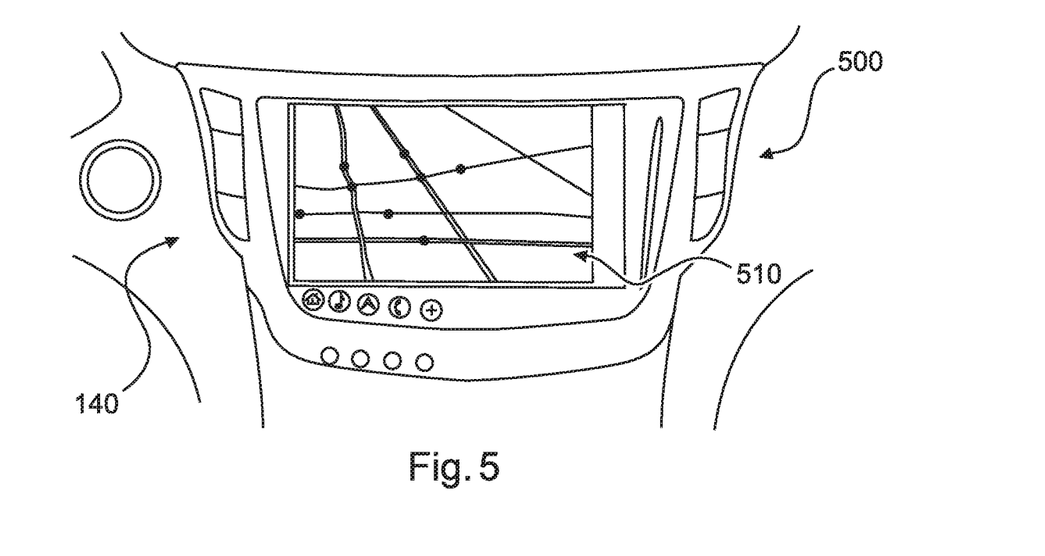
FIG. 5 is a display illustrating a client interface, in accordance with various embodiments.

With reference now to FIG. 5, an exemplary illustration of a map 500 is shown including highlighting autonomous roads 510 and non-autonomous capable roads 505 (e.g. roads for which an autonomous map is not available) in a client interface on the navigation display unit 140. The autonomous roads 510 are highlighted in a visually differentiable way (e.g. dotted line) from non-autonomous capable roads 505. For example, different colors could be used for autonomous and non-autonomous roads. In another example, semiautonomous roads can be highlighted in a yet another visually differentiable way like a different color or another type of shading. The navigation display unit 140 can be a common HMI display. The client interface 130 can be displayed on the navigation display unit and controllable with a touch screen functionality. In another exemplary embodiment, the client interface can include a mechanical interface. The map database 150 is displayed in various ways, with the plan of routes of the local data of the vehicle, where vehicle location is determined through a GPS sensor of the sensor module 106. The autonomous road 510 from the map layer of autonomous data 151 is superimposed on the at least one other layer of map data 154, i.e. the roads in the environment of the current vehicle location, for example in red, on the navigation display unit 140.

Figure 6:
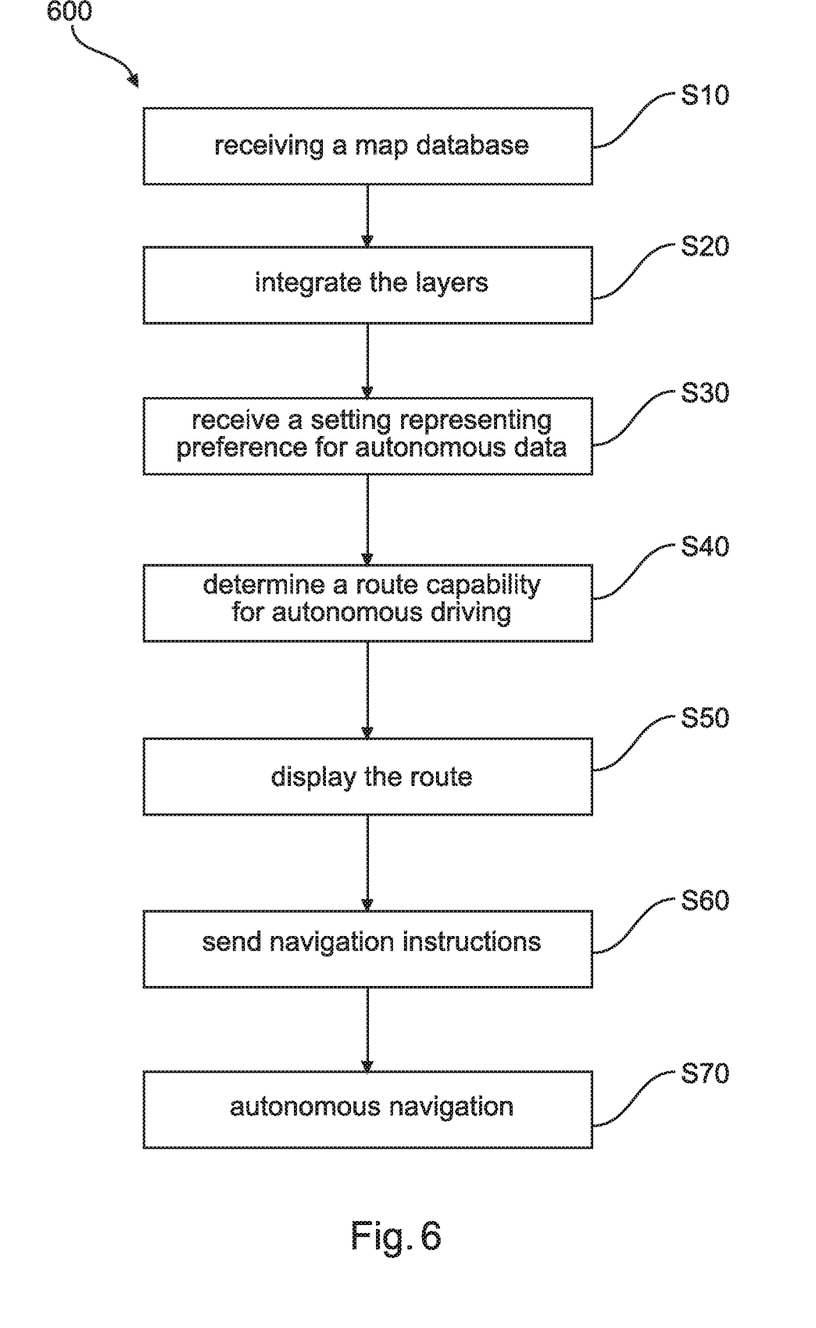
FIG. 6 is a flowchart illustrating a navigation method, in accordance with various embodiments.

With reference now to FIG. 6, an example of a navigation method 600 is shown in accordance with various embodiments. In step S10, a map database including a map layer of autonomous data 151 and at least one map layer of navigation data 154 is received by the navigation system 110 through a navigation processor 120. The map layer of autonomous data 151 and the at least one other layer of map data 154 may be pre-stacked, i.e. the autonomous map layer of autonomous data 151 and the at least one other layer of data 154 are geo-referenced and aligned to each other.

If the map layer of autonomous data 151 and the at least one other layer of data 154 are not pre-stacked, the method 600 includes an optional step S20 by which the map layer of autonomous data 151 is derived from the autonomous driving map 152. The derived map layer of autonomous road data 151 and the at least one other layer of map data 154 are integrated. The navigation processor 120 geo-references the map layers 151, 154a-f to each other based on GPS data in the two map layers by identifying and extracting global positioning data regarding autonomous roads from the autonomous road map 152. Further, step S20 may include aligning the georeferenced map layers 152, 154 for display. Yet further, the step S20 may include further integrating the georeferenced and aligned map layers 152, 154 so that the autonomous road layer 151 marks the at least one other layer of map data 154 with autonomous road data to allow for determining routes based thereon.

In a further step S30, the navigation processor 120 receives a navigation setting of an autonomous road preference through a client interface 130. For example, a driver can select out of different navigation settings to plan a navigation route and/or how to display navigation. GPS based navigation devices enable a user to input, via a client interface, a destination address/location. A start address/location may also be input, although the current location of the vehicle 102 based on a GPS sensor of the sensor module 106 may be taken as the start location. The software calculates an optimal route between the start and destination location using a navigation algorithm based on at least one navigation setting. In contrast to conventional navigation systems, the driver can select, via the client interface 130, a preference for autonomous roads for displaying the autonomous roads on the display and/or determination of route path in a way that prefers autonomous roads. In another example, the navigation setting for preferring autonomous roads can be a default setting such that step S30 is optional.

In an optional next step S40, the navigation processer 120 determines a route based on the user's navigation setting using a navigation algorithm and the destination location. In an example, the navigation processor 120 will determine a route based on a navigation setting preferring autonomous capable roads from the map layer of autonomous data 154.

In an optional next step S50, the route can be displayed. In another example, several alternative route paths can be displayed, which could be selected by a user. The display can include highlighted autonomous roads and, when determined, the determined route from step S30. It is also possible that the displaying step displays a map for browsing by a user that highlights autonomous roads based on the layer of autonomous road data 154 without necessarily determining and displaying a route. The step S50 can include turn by turn instructions that are both displayed and audible. To do so, progress of the vehicle along the determined route is tracked using the GPS sensor of the sensor module 106.

In a further optional next step S60, the navigation processor 120 sends navigation instructions to the vehicle control system 104.

In a further optional next step S70, the vehicle control system 104 uses the navigation instructions in combination with the GPS sensor in the sensor module 106 to control the vehicle autonomously to traverse the determined route.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A navigation system, comprising:
    a map database, comprising:
        a map layer of autonomous road data generated from compression of three-dimensional spatial data and global positioning data,
        a plurality of layers of map data,
        wherein each layer of the plurality of layers includes one of image base data, elevation data, hydrography data, boundaries data, land use area data, and navigation roads data,
        wherein the plurality of layers and the map layer of autonomous road are georeferenced, aligned, and merged into a navigation map; and
    a navigation processor configured to:
        determine a route for a vehicle to a destination preferring use of autonomous roads according to a setting for preferring use of autonomous roads and based on the navigation map, control the vehicle autonomously along the route based on the navigation map, and
        display a display map for a vehicle through a navigation display unit including highlighting autonomous roads on the navigation display unit, based on the map layer of autonomous road data, together with the at least one other layer of map data.

2. The navigation system according to claim 1, further comprising a client interface comprising a menu comprising a list of navigation settings, the navigation settings including a setting for preferring use of autonomous roads that is selectable through the client interface.

3. The navigation system according to claim 1, comprising a navigation display unit, wherein the navigation processor is configured to display, through a navigation display unit, the route including first highlighting of autonomous roads based on the map layer of autonomous road data together with second highlighting of non-autonomous roads based on the at least one other layer of map data, wherein the first and second highlighting are displayed in a visually differentiable manner.

4. The navigation system according to claim 1, wherein the map layer of autonomous road data is derived from an autonomous driving map, wherein the navigation processor is further configured to output navigation instructions to an autonomous vehicle control system for autonomous vehicle control based on the autonomous driving map.

5. The navigation system according to claim 1, wherein the navigation processor is further configured to display a set of possible paths, and wherein a subset of the paths that are enabled for autonomous driving is highlighted.

6. The navigation system according to claim 1, wherein the map layer of autonomous road data is derived from a machine to machine autonomous map that includes autonomous driving attributes and global positioning data.

7. The navigation system according to claim 1, being comprised in a server remote from the vehicle and in communication with the vehicle over a mobile communications network.

8. The navigation system according to claim 1, wherein the map layer of autonomous road data is derived from an autonomous map connected to a mobile communication network for receiving map updates from a remote server, wherein the navigation processor is configured to update the map layer of autonomous road data based on the map updates of the autonomous map.

9. The navigation system according to claim 1, wherein the map layer of the autonomous road data is assimilated with other layers of navigation map data from a different map source.

10. The navigation system according to claim 1, wherein the plurality of layers of map data is derived from a navigation map and the map layer of autonomous road data is derived from an autonomous driving map, wherein the navigation map and the autonomous driving map are separately stored on two different storage locations.

11. The navigation system according to claim 1 being comprised in a mobile electronic device.

12. A method for a navigation system, comprising:
receiving, via a navigation processor of the navigation system, a map database comprising a layer of autonomous road data generated from compression of three-dimensional spatial data and global positioning data and a plurality of layers of other map data,
wherein each layer of the plurality of layers includes one of image base data, elevation data, hydrography data, boundaries data, land use area data, and navigation roads data, and
wherein the plurality of layers and the map layer of autonomous road are georeferenced, aligned, and merged into a navigation map;
processing, via the navigation processor, the layer of autonomous road data and the layer of other map data to determine a route for a vehicle to a destination preferring use of autonomous roads according to a setting for preferring use of autonomous roads and based on the navigation map, to control the vehicle autonomously along the route based on the navigation map, and
to display a display map through a navigation display unit including highlighting autonomous roads on the navigation display unit, based on the map layer of autonomous road data, together with the at least one other layer of map data.

13. The navigation method according to claim 12, further comprising:
deriving the layer of autonomous road data from a machine to machine autonomous driving map.

14. The navigation method according to claim 12 further comprising displaying, through a navigation display unit, the route including highlighting autonomous roads together with the at least one other layer of map data.

15. A non-transitory computer readable medium comprising computer readable instructions, the instructions when executed by a processor, cause to be performed the corresponding method:
receiving, via a navigation processor, a map database comprising a layer of autonomous road data generated from compression of three-dimensional spatial data and global positioning data and a plurality of layers of other map data,
wherein each layer of the plurality of layers includes one of image base data, elevation data, hydrography data, boundaries data, land use area data, and navigation roads data, and
wherein the plurality of layers and the map layer of autonomous road are georeferenced, aligned, and merged into a navigation map;
processing, via a navigation processor, the layer of autonomous road data and the layer of other map data to determine a route for a vehicle to a destination preferring use of autonomous roads according to a setting for preferring use of autonomous roads and based on the navigation map, control the vehicle autonomously along the route based on the navigation map, and
display a display map through a navigation display unit including highlighting autonomous roads on the navigation display unit, based on the map layer of autonomous road data, together with the at least one other layer of map data.

\* \* \* \* \*